United States Patent
Kozhukh et al.

(10) Patent No.: US 7,812,705 B1
(45) Date of Patent: *Oct. 12, 2010

(54) HIGH TEMPERATURE THERMISTOR PROBE

(75) Inventors: Michael Kozhukh, Palo Alto, CA (US); Michael Shkolnikov, San Jose, CA (US)

(73) Assignee: AdSem, Inc., Palo Alto, CA (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/398,035

(22) Filed: Apr. 4, 2006

Related U.S. Application Data

(63) Continuation-in-part of application No. 11/014,408, filed on Dec. 15, 2004, now Pat. No. 7,292,132.

(60) Provisional application No. 60/530,326, filed on Dec. 17, 2003.

(51) Int. Cl.
*H01C 13/00* (2006.01)
(52) U.S. Cl. ..................... 338/220
(58) Field of Classification Search .......... 338/220
See application file for complete search history.

(56) References Cited

U.S. PATENT DOCUMENTS

| | | | |
|---|---|---|---|
| 3,374,404 A | 3/1968 | Luecke | |
| 3,568,125 A | 3/1971 | Villemant et al. | |
| 3,629,585 A | 12/1971 | Desvignes et al. | |
| 3,745,506 A | 7/1973 | Bethe | |
| 3,881,181 A | 4/1975 | Khajezadeh | |
| 3,936,789 A | 2/1976 | Matzen | |
| 4,009,482 A | 2/1977 | Nakata | |
| 4,035,757 A | 7/1977 | Einthoven et al. | |
| 4,047,436 A | 9/1977 | Bernard et al. | |
| 4,063,210 A | 12/1977 | Collver | |
| 4,276,535 A | 6/1981 | Mitsuyu et al. | |
| 4,359,372 A * | 11/1982 | Nagai et al. | 204/192.21 |
| 4,586,829 A | 5/1986 | Hübner et al. | |
| 4,772,866 A | 9/1988 | Willens | |
| 5,037,766 A | 8/1991 | Wang | |
| 5,066,938 A | 11/1991 | Kabashi et al. | |
| 5,081,438 A | 1/1992 | Nakahata et al. | |
| 5,141,334 A | 8/1992 | Castles | |
| 5,172,211 A | 12/1992 | Godinho et al. | |
| 5,183,530 A | 2/1993 | Yamazaki | |
| 5,446,437 A | 8/1995 | Bantien et al. | |
| 5,924,996 A | 7/1999 | Cho et al. | |
| 5,969,238 A | 10/1999 | Fischer | |
| 6,023,978 A | 2/2000 | Dauenhauer et al. | |
| 6,077,228 A * | 6/2000 | Schonberger | 600/549 |

(Continued)

OTHER PUBLICATIONS

Wolf, Stanley, et al, "Silicon Processing for the VLSI Era," vol. 1, Second Edition, copyright 2000, Lattice Press, pp. 842-845.

(Continued)

*Primary Examiner*—Elvin G Enad
*Assistant Examiner*—Joselito Baisa
(74) *Attorney, Agent, or Firm*—Blakely Sokoloff Taylor & Zafman, LLP

(57) ABSTRACT

In one embodiment, a thermistor probe includes a probe body, a high temperature NTC semiconductor thermistor attached to the probe body, and at least two conductive leads attached to the high temperature NTC semiconductor thermistor.

18 Claims, 18 Drawing Sheets

U.S. PATENT DOCUMENTS

| | | | |
|---|---|---|---|
| 6,122,704 | A | 9/2000 | Hass |
| 6,316,770 | B1 | 11/2001 | Ouvrier-Buffet |
| 6,319,429 | B1 | 11/2001 | Moos et al. |
| 6,354,736 | B1 | 3/2002 | Cole et al. |
| 6,380,840 | B1 | 4/2002 | Wienand et al. |
| 6,433,666 | B1 * | 8/2002 | Inoue et al. ............ 338/22 R |
| 6,744,346 | B1 | 6/2004 | Akram et al. |
| 6,863,438 | B2 | 3/2005 | Pannek et al. |
| 2002/0179992 | A1 | 12/2002 | Parsons |
| 2002/0190337 | A1 | 12/2002 | House et al. |

OTHER PUBLICATIONS

U.S. Appl. No. 10/846,055, Office Action dated Aug. 18, 2006, 7 pages.
U.S. Appl. No. 10/846,055, Final Office Action dated Jan. 23, 2007, 11 pages.
U.S. Appl. No. 10/846,055, Notice of Allowance dated Apr. 19, 2007, 7 pages.
U.S. Appl. No. 10/846,055, Notice of Allowance dated Sep. 13, 2007, 10 pages.
U.S. Appl. No. 11/788,441, Office Action dated Dec. 14, 2007, 8 pages.
U.S. Appl. No. 11/788,441, Notice of Allowance dated May 8, 2008, 6 pages.
U.S. Appl. No. 11/788,440, Office Action dated Dec. 13, 2007, 11 pages.
U.S. Appl. No. 11/788,440, Notice of Allowance dated Apr. 21, 2008, 8 pages.
U.S. Appl. No. 11/014,408, Office Action dated May 2, 2006, 7 pages.
U.S. Appl. No. 11/014,408, Office Action dated Oct. 18, 2005, 6 pages.
U.S. Appl. No. 11/014,408, Office Action dated Aug. 15, 2006, 12 pages.
U.S. Appl. No. 11/014,408, Notice of Allowance dated Jun. 8, 2007, 6 pages.
U.S. Appl. No. 11/014,408, Notice of Allowance dated Jan. 23, 2007, 5 pages.
Wolf, Stanley, et al, "Silicon Processing for the VLSI Era," vol. 1, Second Edition, copyright 2000, Lattice Press, pp. 5-28.

* cited by examiner

US 7,812,705 B1

HIGH TEMPERATURE THERMISTOR PROBE

RELATED APPLICATION

This application is a continuation-in-part of U.S. patent application Ser. No. 11/014,408 filed on Dec. 15, 2004 now U.S. Pat. No. 7,292,132, which is related to and claims the benefit of U.S. Provisional Patent application Ser. No. 60/530,326 filed Dec. 17, 2003, which are hereby incorporated by reference.

TECHNICAL FIELD

This invention relates to thermometry, and more particularly to the manufacture and use of thermistor probes.

BACKGROUND

The measurement of temperature is important in many applications, including, for example, manufacturing, medicine, food processing, and food storage. The most common electrical measurement devices include thermocouples, and negative temperature coefficient (NTC) thermistors.

A NTC thermistor is a thermally sensitive device whose resistance decreases with an increase in temperature. To measure a thermistor's resistance, a small current is passed through the thermistor, and the voltage drop produced is measured. Currently, NTC thermistors used for high temperature measurements (measurements in excess of −30° C.) are made of metal oxide ceramics.

The change in resistance exhibited by metal oxide ceramic NTC thermistors is strongly non-linear, and most such thermistors have a useful temperature span of up to about 300° C. The field of use of these thermistors is naturally limited to applications where temperatures do not exceed 300° C. Furthermore, metal oxide ceramic NTC thermistors are moisture sensitive, and therefore must be protected from their external environment by encapsulating them in, for example, metal, epoxy, or glass. Such encapsulation separates the thermistor from the environment to be measured, which causes a delay in response time due to a temperature gradient between the environment and the thermistor. Where a metal encapsulation is used, such as with metal tubes, the delay in response time can be reduced. However, metal encapsulation does not function well in radio frequency (RF) fields.

BRIEF DESCRIPTION OF THE DRAWINGS

Features and advantages of the present invention will be apparent upon reading the following detailed description in conjunction with the accompanying drawings and appended claims provided below, where:

DETAILED DESCRIPTION

In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative, and are not restrictive of the current invention. Embodiments of this invention are not restricted to the specific constructions and arrangements shown and described, because modifications may occur to those ordinarily skilled in the art.

Figure 1:
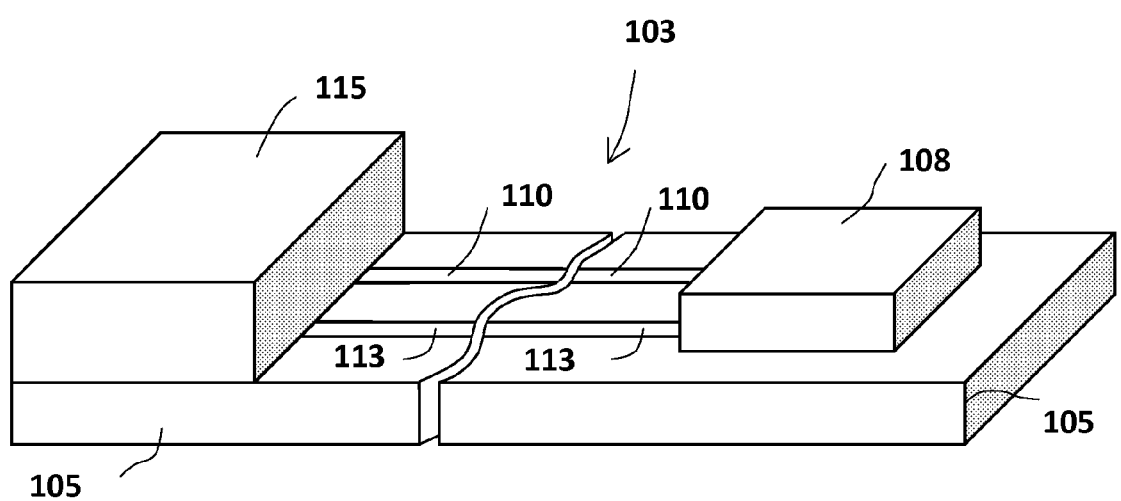
FIG. 1 illustrates a plan view of a thermistor probe, in accordance with one embodiment of the present invention.

FIG. 1 illustrates a plan view of a thermistor probe 103 in accordance with one embodiment of the present invention. The thermistor probe 103 includes a probe body 105, a high temperature semiconductor NTC thermistor ("HTS thermistor") 108, a first conductive lead 110 and a second conductive lead 113. In one embodiment, the probe body 105 comprises an inflexible insulator, such as, for example, prepreg, polyimide, ceramic, quartz, teflon, Silicon Carbide, capton and diamond. In an alternative embodiment, the probe body 105 is a flexible insulator such as thin polyimide, teflon, or FR-4. The probe body 105 may be manufactured in many shapes and sizes, the exact dimensions of which are dictated by the application for which the specific thermistor probe 103 will be used.

In one embodiment, the HTS thermistor 108 comprises crystalline Silicon (Si) and/or Germanium (Ge). Thermistors made of crystalline Si and thermistors made of crystalline Ge are chemically stable and do not absorb moisture. Therefore, HTS thermistors 108 made of Si or Ge do not need to be protected from humid environments, and can operate accurately without being encapsulated. This can reduce manufacturing time and cost, and can decrease the response time for temperature measurements.

HTS thermistors 108 made from Si or Ge can have a wide temperature operating range. In one embodiment, the HTS thermistor 108 has a minimum temperature reading of about −100° C. and a maximum temperature reading of about 500° C. In one embodiment, the HTS thermistor 108 comprises Si and has a maximum thermo sensitivity of about 7.3% per degree at around 25° C.

In one embodiment, the Si and/or Ge HTS thermistors have electrical conductivity at or close to their intrinsic conductivity. In an alternative embodiment, the HTS thermistor 108 comprises Gallium Arsenide (GaAs) or Indium Antimonide (InSb) with intrinsic conductivity.

Referring back to FIG. 1, the HTS thermistor 108 is surface mounted on the probe body 105. In one embodiment, the HTS thermistor 108 is bonded to the first conductive lead 110 and/or second conductive lead 113 with silver epoxy. In an alternative embodiment the HTS thermistor 108 is soldered to the first conductive lead 110 and/or second conductive lead 113. In an alternative embodiment, the HTS thermistor 108 is located inside of the probe body 105. In one embodiment, the thermistor probe 103 includes two or more HTS thermistors 108. Where a thermstor probe 103 includes multiple HTS thermistors 108, each HTS thermistor 108 may be surface mounted or located inside the probe body 105 of the thermistor probe 103.

The first conductive lead 110 and second conductive lead 113 may comprise metals such as copper, nickel, tin and gold. In the illustrated embodiment, the first conductive lead 110 and second conductive lead 113 are conductive lines formed on the surface of the probe body 105. In alternative embodiments, one or both of the first and second conductive leads 110 and 113 may comprise a metal film or layer coating one or more sides of the probe body 105, or a metal wire wire-bonded to the HTS thermistor 108.

In the illustrated embodiment of FIG. 1, the first conductive lead 110 and second conductive lead 113 connect to a measuring circuit 115 that is mounted onto the probe body 105. In one embodiment, the measuring circuit 115 is located far enough from the HTS thermistor 108 that heat in the measurable area will not affect temperature readings. In one embodiment, only the first conductive lead 110 connects to the measuring circuit 115. In a further embodiment, the thermistor probe 103 does not include a measuring circuit 115.

Figure 2A:
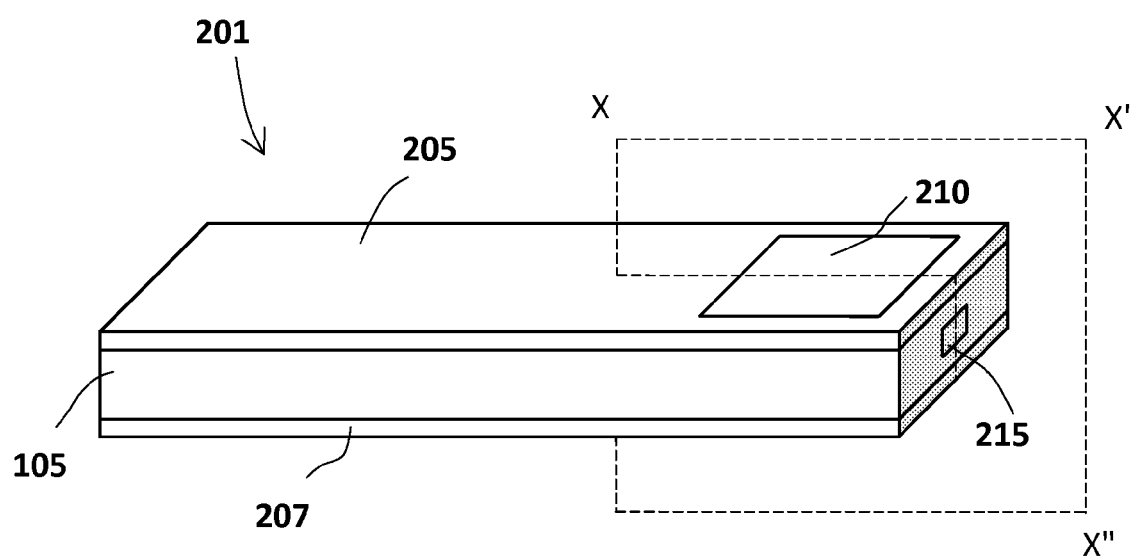
FIG. 2A illustrates a plan view of a one thermistor probe, in accordance with one embodiment of the present invention.
Figure 2B:
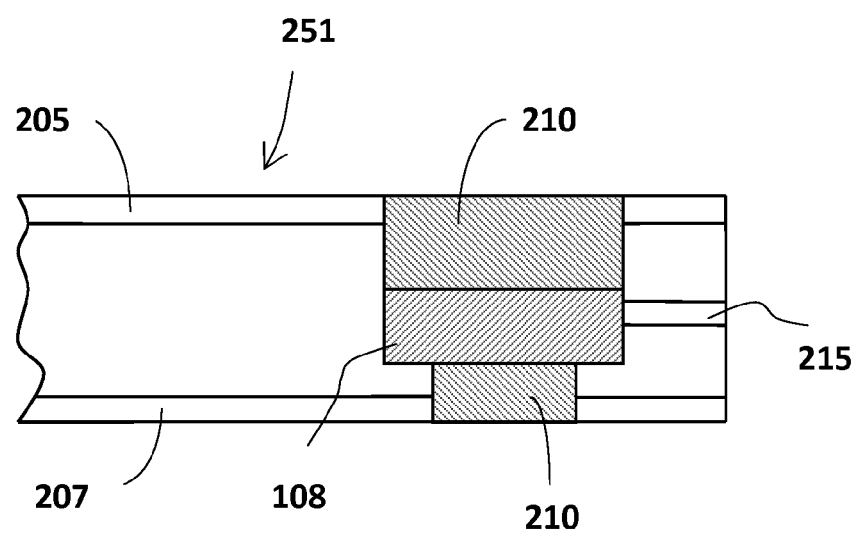
FIG. 2B illustrates a cross sectional view of the one thermistor probe shown in FIG. 2A.

FIGS. 2A and 2B illustrate a plan view and a cross sectional view, respectively, of a thermistor probe, in accordance with one embodiment of the present invention. FIG. 2A shows a one-thermistor probe 201 comprising a probe body 105, a first outer electrically conductive layer 205 that coats a first surface of the probe body 105 and a second outer electrically conductive layer 207 that coats a second surface of the probe body 105. In the illustrated embodiment, the first outer electrically conductive layer 205 and second outer electrically conductive layer 207 act as conductive leads.

An HTS thermistor (not shown) is located within the probe body 105 and covered with a conductive epoxy 210, such as silver epoxy, to physically bond the HTS thermistor to the first outer electrically conductive layer 205 and/or the second outer electrically conductive layer 207. In one embodiment, the conductive epoxy also provides electrical contact to the first outer electrically conductive layer 205 and second outer electrically conductive layer 207. In alternative embodiments, different bonding techniques and materials, other than conductive epoxy 210, may be used to electrically connect the HTS thermistor to the first and second outer electrically conductive layers 205 and 207.

In the illustrated embodiment of FIG. 2A, a channel 215 is provided that allows air access to the HTS thermistor. A channel 215 can be a hole drilled in the probe body 105 that allows the thermistor to have direct contact to the environment that the thermistor measures. This can improve thermistor response time. In the illustrated embodiment, the channel 215 is positioned approximately horizontally, in which the channel 215 is approximately parallel to the first outer electrically conductive layer 205. In an alternative embodiment, the channel 215 is positioned approximately vertically, in which the channel 215 is approximately perpendicular to the first outer electrically conductive layer 205. Where the channel 215 is positioned approximately vertically, the channel may be formed in the conductive epoxy 210. In alternative embodiments, multiple channels may be used, or no channels may be used.

FIG. 2B shows a zoomed-in cross sectional view 251 of the one-thermistor probe 201 of FIG. 2A sliced along plane X-X'-X". As illustrated, the HTS thermistor 108 is located inside the probe body 105. Conductive epoxy 210 bonds the HTS thermistor 108 and electrically connects it to the first outer electrically conductive layer 205 and second outer electrically conductive layer 207. As shown, channel 215 provides air access to the HTS thermistor 108.

Figure 3A:
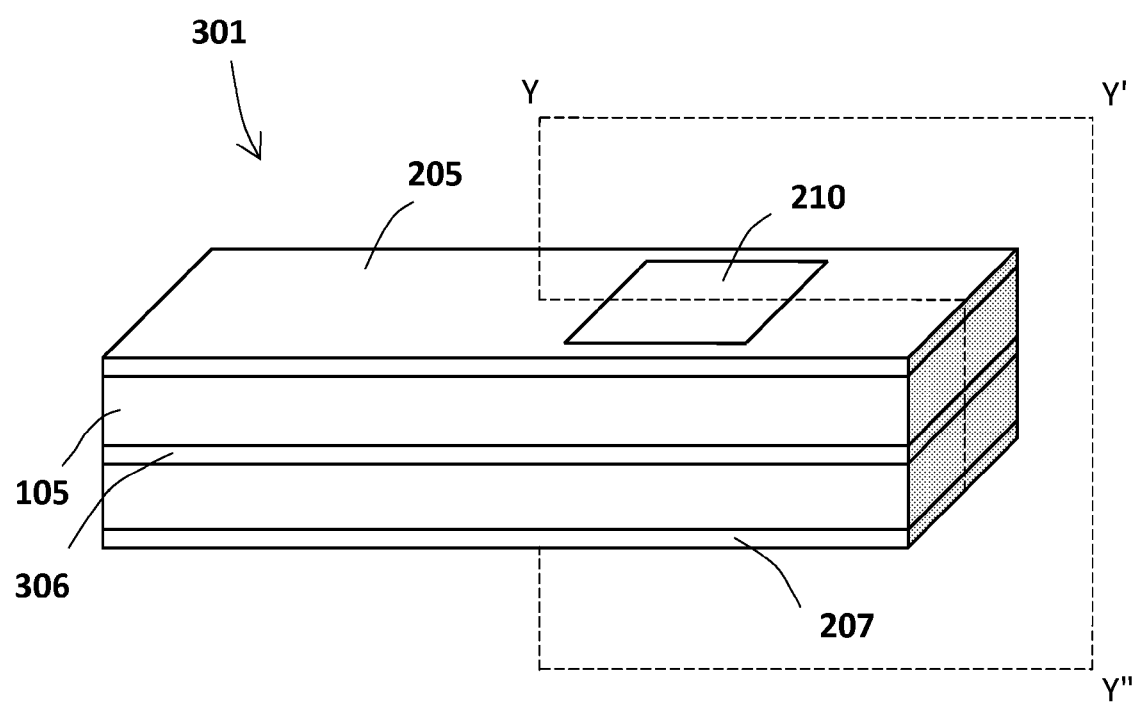
FIG. 3A illustrates a plan view of a two thermistor probe, in accordance with one embodiment of the present invention.
Figure 3B:
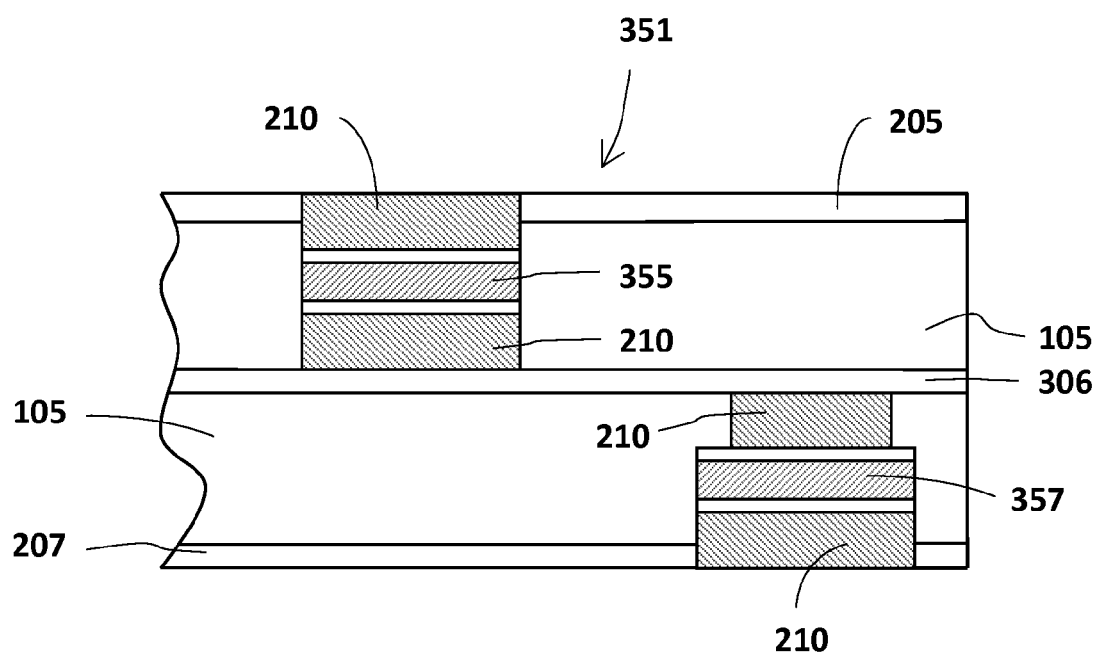
FIG. 3B illustrates a cross sectional view of the two thermistor probe shown in FIG. 3A.

FIGS. 3A and 3B illustrate a plan view and a cross sectional view, respectively, of a thermistor probe, in accordance with one embodiment of the present invention. FIG. 3A shows a two-thermistor probe 301 comprising a probe body 105, a first outer electrically conductive layer 205, a second outer electrically conductive layer 207 and an inner electrically conductive layer 306 inside the probe body. The first outer electrically conductive layer 205, second outer electrically conductive layer 207 and inner electrically conductive layer 306 act as conductive leads. Two HTS thermistors (not shown) are located within the probe body 105 and covered and/or connected with a conductive epoxy 210.

FIG. 3B shows a zoomed in cross sectional view 351 of the two-thermistor probe 301 of FIG. 3A sliced along plane Y-Y'-Y". A first HTS thermistor 355 is located inside the probe body 105 and connected to the first outer electrically conductive layer 205 and inner electrically conductive layer 306. A second HTS thermistor 357 is located inside the probe body 105 and connected to the second outer electrically conductive layer 207 and inner electrically conductive layer 306.

In the illustrated embodiment, the first HTS thermistor 355 and second HTS thermistor 357 include ohmic contacts 360. Ohmic contacts 360 provide electrical contact for connection between the HTS thermistors and metal leads. In one embodiment, the ohmic contacts 360 comprise aluminum. In an alternative embodiment, the ohmic contacts comprise a metal such as titanium, nickel, or gold. Conductive epoxy 210 electrically connects the first HTS thermistor 355 and second HTS thermistor 357 to the electrically conductive layers through the ohmic contacts 360.

Figure 4A:
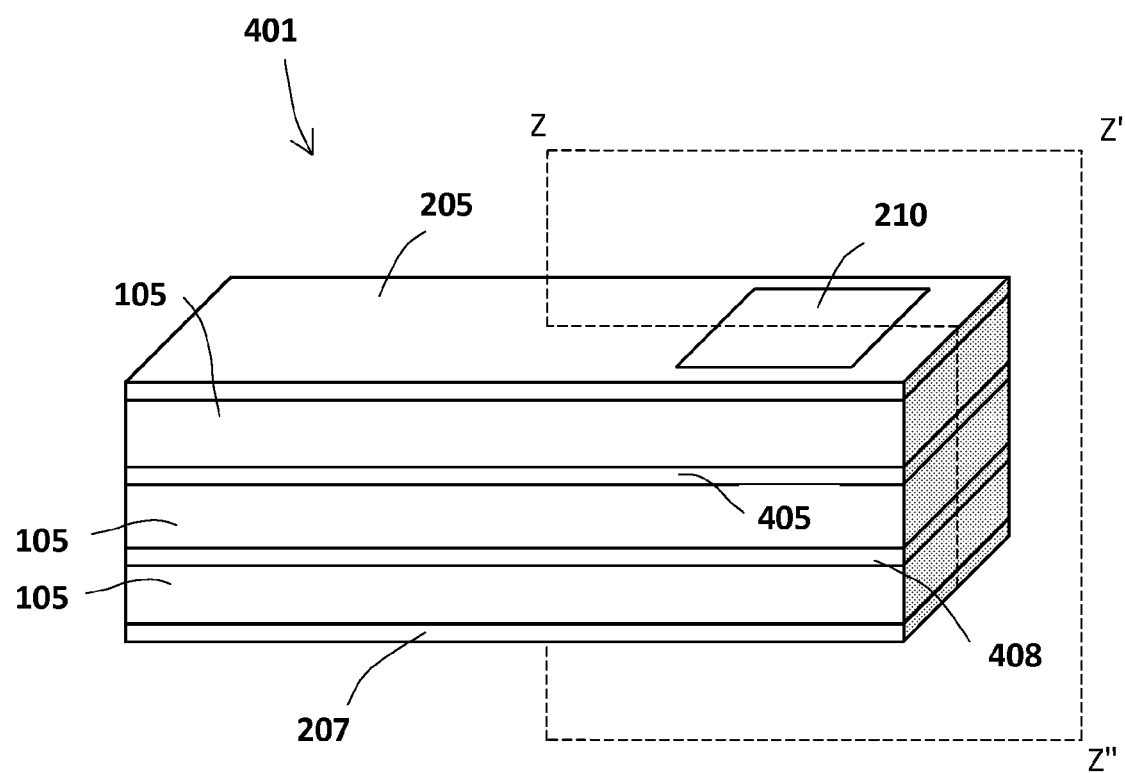
FIG. 4A illustrates a plan view of a two thermistor probe, in accordance with one embodiment of the present invention.
Figure 4B:
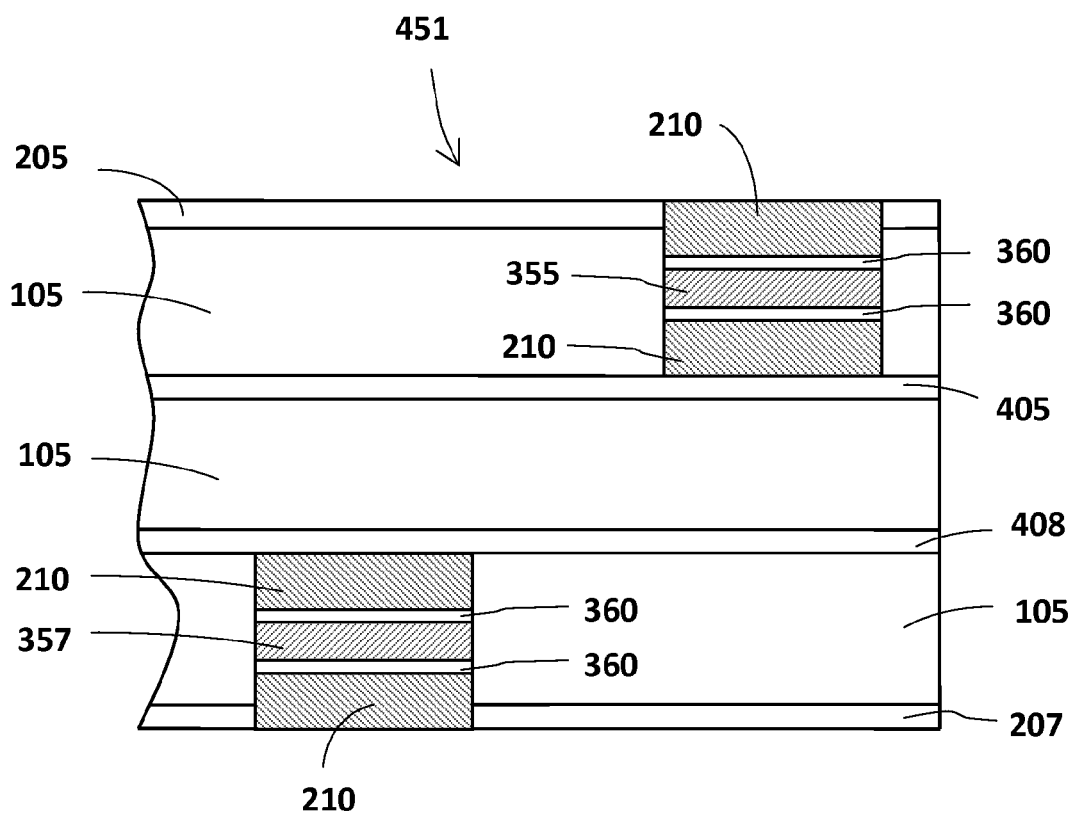
FIG. 4B illustrates a cross sectional view of the two thermistor probe shown in FIG. 4A.

FIGS. 4A and 4B illustrate a plan view and a cross sectional view, respectively, of a thermistor probe, in accordance with one embodiment of the present invention. FIG. 4A shows a two-thermistor probe 401 comprising a probe body 105, a first outer electrically conductive layer 205, a second outer electrically conductive layer 207, a first inner electrically conductive layer 405 and a second inner electrically conductive layer 408. Two HTS thermistors (not shown) are located within the probe body 105 and covered with a conductive epoxy 210.

FIG. 4B shows a zoomed in cross sectional view 451 of the two-thermistor probe 401 of FIG. 4A sliced along plane Z-Z'-Z". A first HTS thermistor 355 includes ohmic contacts 360 and is connected to the first outer electrically conductive layer 205 and first inner electrically conductive layer 405 by conductive epoxy 210. A second HTS thermistor 357 includes ohmic contacts 360 and is connected to the second outer electrically conductive layer 207 and second inner electrically conductive layer 408 by conductive epoxy 210. In one embodiment, the two-thermistor probe 401 includes a measuring circuit (not shown) connected to the first HTS thermistor 355 through the first outer electrically conductive layer 205 and first inner electrically conductive layer 405, and the second HTS thermistor 357 through the second outer electrically conductive layer 207 and second inner electrically conductive layer 408. In one embodiment, the measuring circuit reads the first HTS thermistor 355 and second HTS thermistor 357 sequentially. In one embodiment, a switch is used to determine which HTS thermistor to read. In an alternative embodiment, two measuring circuits are implemented, one connected to the first HTS thermistor 355 and one connected to the second HTS thermistor 357.

Figure 5:
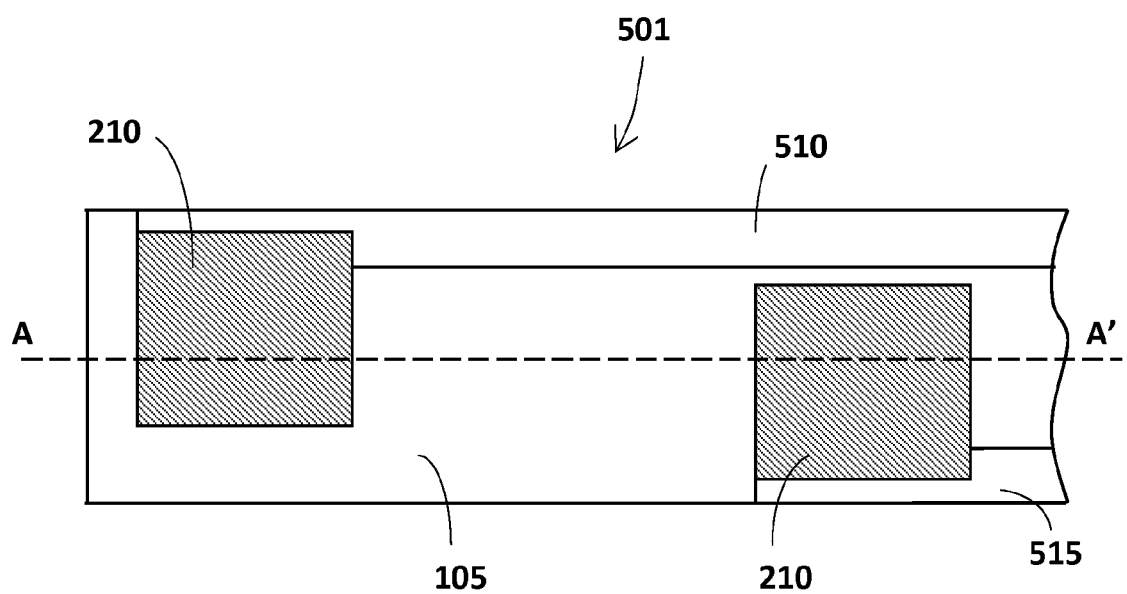
FIG. 5 illustrates a top view of a two thermistor probe, in accordance with one embodiment of the present invention.
Figure 6A:
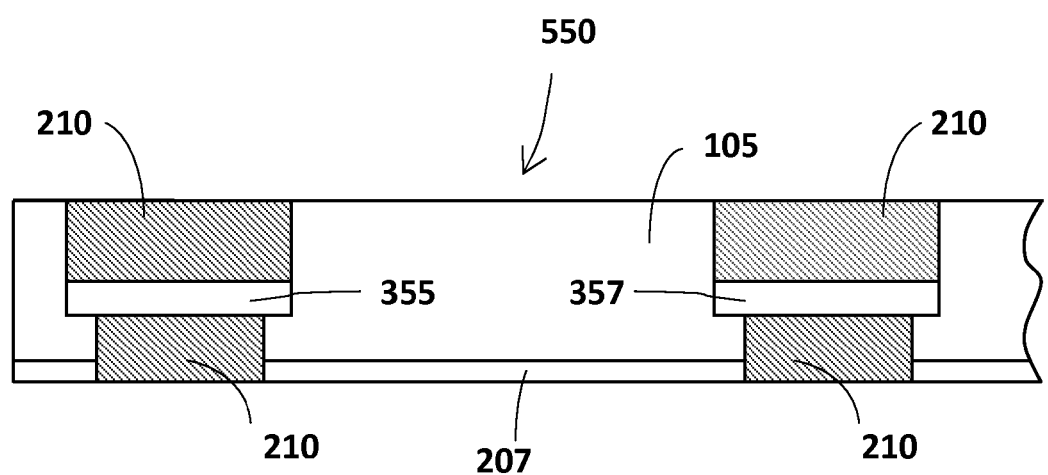
FIG. 6A illustrates a cross sectional side view of the two thermistor probe shown in FIG. 5.
Figure 6B:
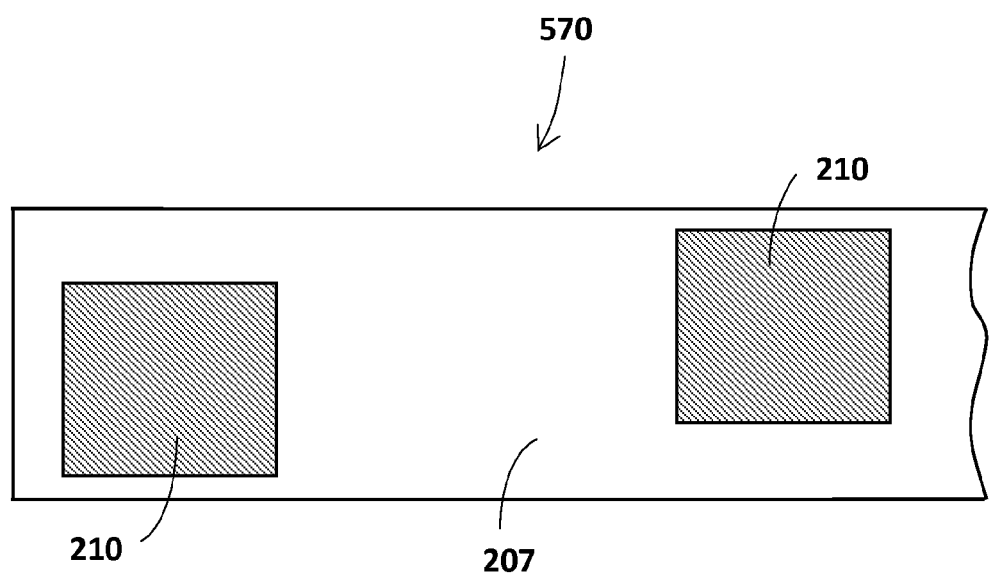
FIG. 6B illustrates a bottom view of the two thermistor probe shown in FIG. 5.

FIG. 5 illustrates a top view of a two-thermistor probe 501, in accordance with one embodiment of the present invention. FIG. 6A shows a cross sectional side view 550 of the two-thermistor probe 501 of FIG. 5 sliced along line A-A'. FIG. 6B shows a bottom view 570 of the two-thermistor probe of FIG. 5. The two thermistor probe 501 includes a probe body 105, a first outer electrically conductive layer (not labeled) and a second outer electrically conductive layer 207. In the illustrated embodiment, the first outer electrically conductive layer has been etched such that it is divided into a first lead 510 and a second lead 515. The first lead 510 and second lead 515 may comprise a pre-selected width. In one embodiment, the first lead 510 and second lead 515 have a width of approximately 100 um. The first HTS thermistor 355 is electrically connected to the first lead 510 and the second outer electrically conductive layer 207 by conductive epoxy 210. The second HTS thermistor 357 is electrically connected to the second lead 515 and the second outer electrically conductive layer 207 by conductive epoxy 210. The first and second HTS thermistors 355 and 357 may have the same physical dimensions or different physical dimensions.

Figure 7:
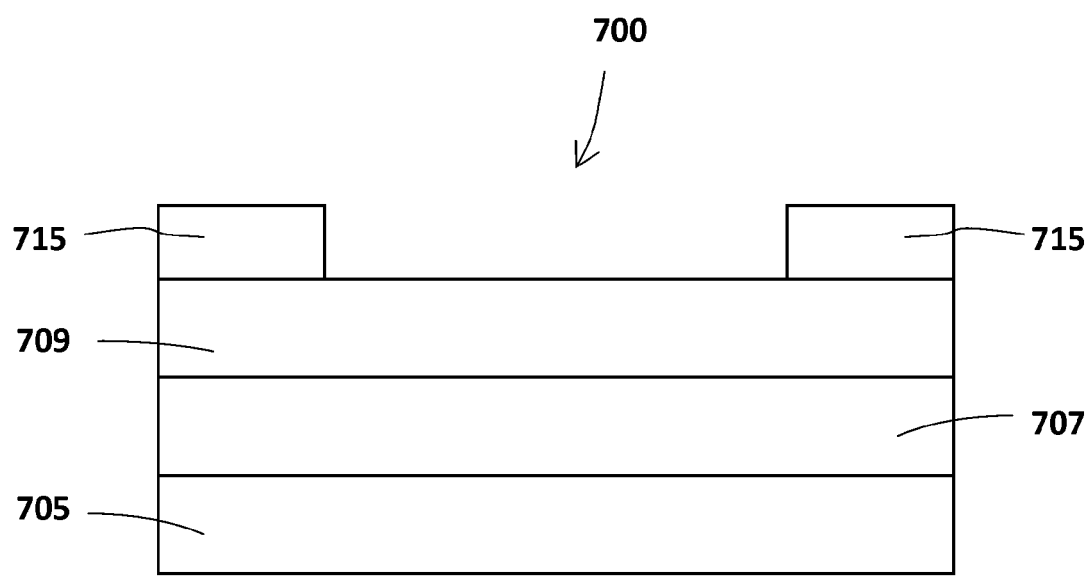
FIG. 7 illustrates a cross sectional view of an integrated thermistor, in accordance with one embodiment of the present invention.

FIG. 7 illustrates a cross sectional view of an integrated thermistor 700, in accordance with one embodiment of the present invention. In the illustrated embodiment, the integrated thermistor 700 includes a substrate 705, an insulative layer 707, an HTS thermistor layer 709, and ohmic contacts 715.

The substrate may comprise a standard semiconductor substrate such as, for example, Si, Ge, or GaAs. In one embodiment, the HTS thermistor layer 709 is a thermosensitive silicon film with intrinsic conductivity. In one embodiment, the ohmic contacts 715 comprise Al. In the illustrated embodiment, the ohmic contacts 715 are patterned to form two interconnects that can act as conductive leads. The ohmic contacts 715 can be patterned, for example, by using standard photolithography and etch techniques. The ohmic contacts 715 may electrically connect the HTS thermistor layer 709 to other integrated devices or to external devices.

In one embodiment, the insulative layer 707 separates the thermistor layer 709 from the substrate 705. In one embodiment, the insulative layer 707 is deposited over additional layers. The additional layers may comprise, for example, transistor structures, memory structures, or the like. In one embodiment, a measuring circuit structure is electrically connected to the integrated thermistor 700.

Figure 8:
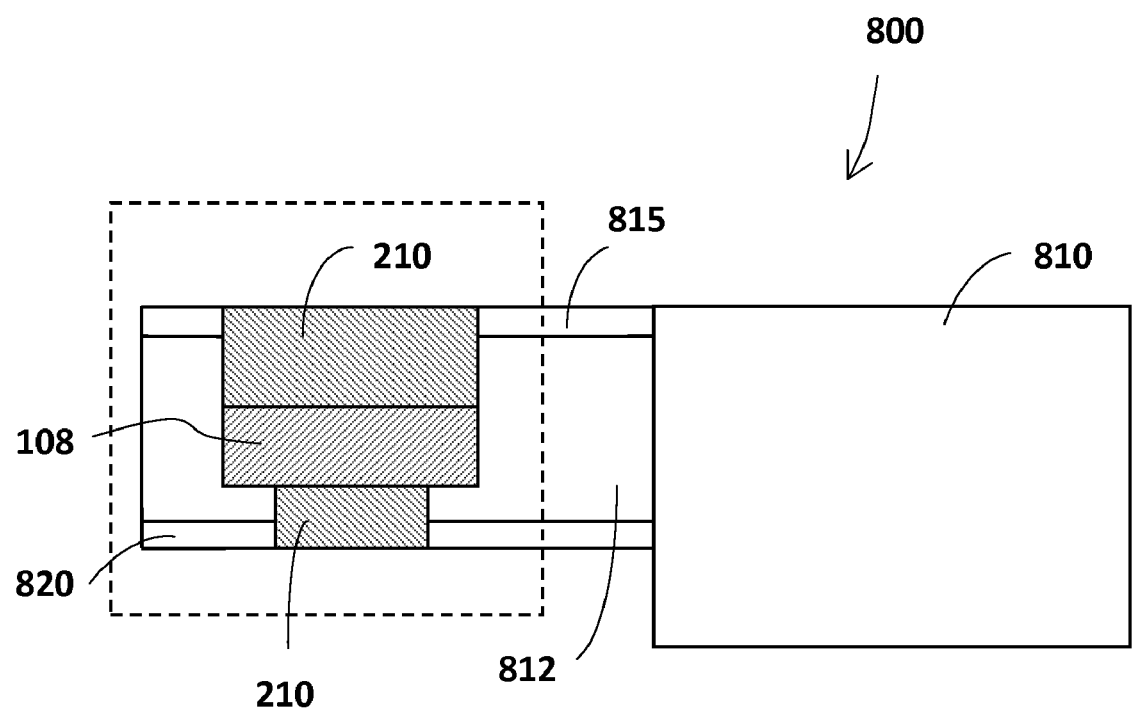
FIG. 8 illustrates a plan view of a system, in accordance with one embodiment of the present invention.

FIG. 8 illustrates a side view of a system 800, in accordance with one embodiment of the present invention. The system 800 includes a temperature sensor assembly 805 connected to an electrical device 810. The temperature sensor assembly 805 includes an HTS thermistor 108 inside an insulative body 812, and two conductive leads 815 and 820. In one embodiment, the electrical device 810 is a circuit board.

Figure 9A:
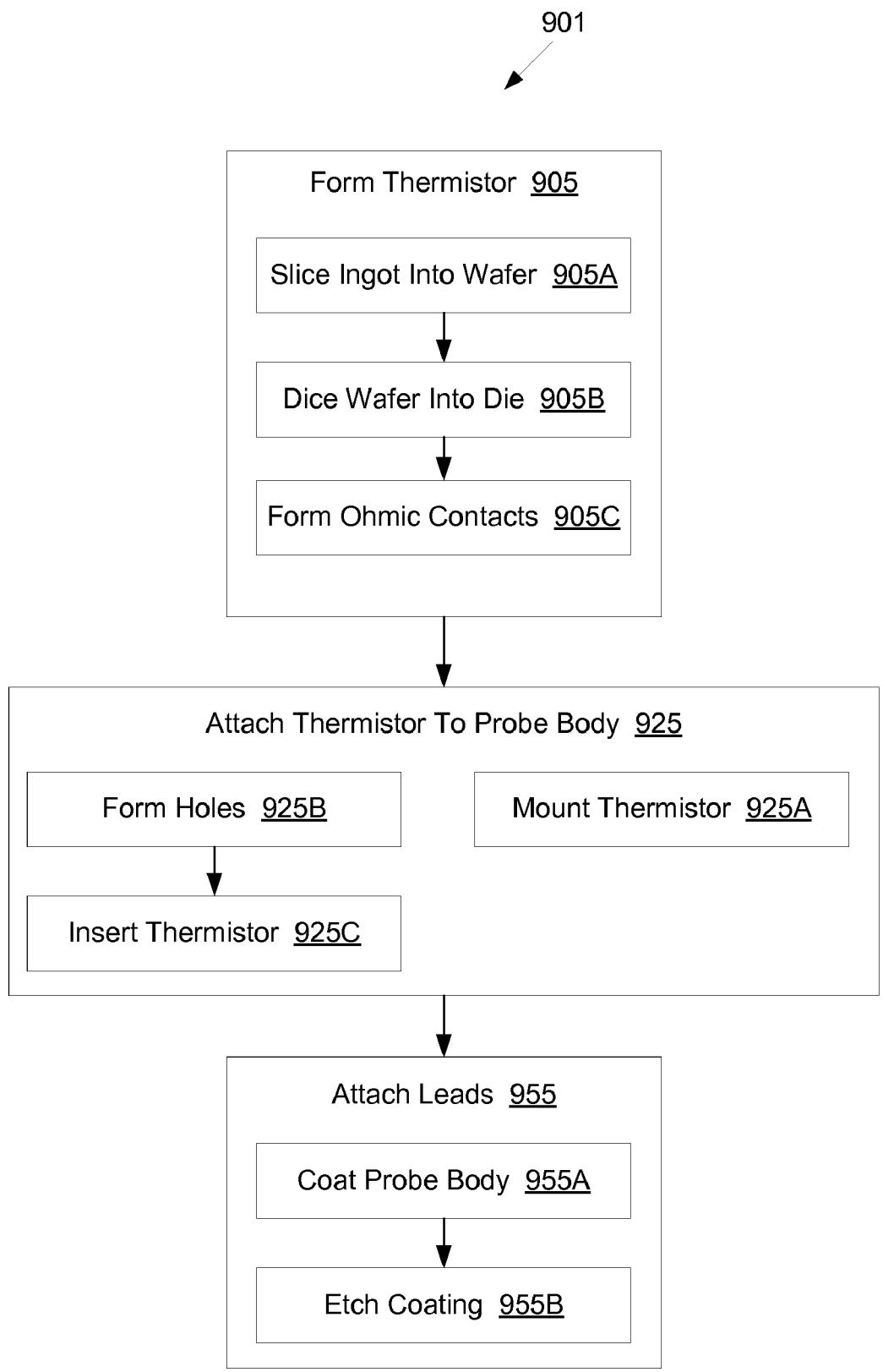
FIG. 9A illustrates a process flow of a method for forming a thermistor probe, in accordance with one embodiment of the present invention.

FIG. 9A illustrates a flow diagram of a process 901 for forming a thermistor probe, in accordance with one embodiment of the present invention. At block 905, an HTS thermistor is formed. In one embodiment, the HTS thermistor is a high temperature NTC semiconductor thermistor that comprises Si or Ge with intrinsic conductivity. In one embodiment, forming the HTS thermistor comprises slicing a Si or Ge ingot into wafers of a predetermined thickness, block 905A. Subsequently, at block 905B, the wafers are diced into die having a predetermined width and length.

In one embodiment, forming an HTS thermistor includes forming at block 905C ohmic contacts on one or more surfaces of the HTS thermistor. In one embodiment, ohmic contacts are formed by deposition of a metal film on a heated semiconductor substrate. In one embodiment, the metal film comprises Aluminum. In one embodiment, the semiconductor substrate is heated to a temperature in the range of about 300 to about 500° C. before deposition to form the ohmic contacts.

Referring to FIG. 9A, at block 925, the HTS thermistor is attached to a probe body. In one embodiment, attaching the HTS thermistor to the probe body comprises mounting the HTS thermistor onto the probe body, as shown at block 925A. In one embodiment, attaching the HTS thermistor to the probe body includes forming at least one hole in the probe body, block 925B, and inserting the HTS thermistor into the at least one hole, block 925C.

Figure 9B:
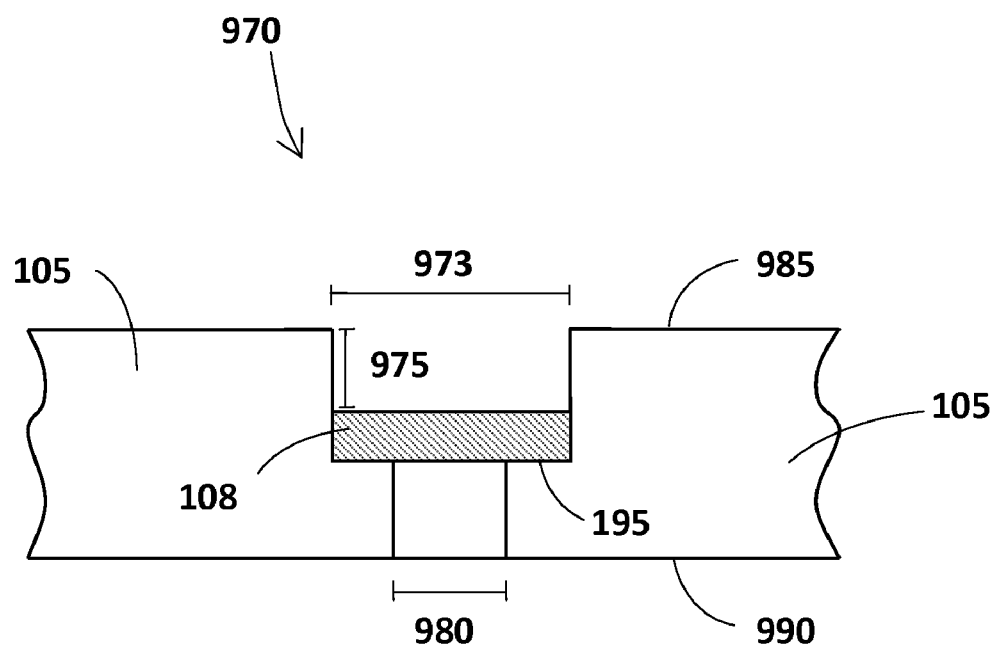
FIG. 9B illustrates a cross sectional side view of the thermistor probe formed according to the method shown in FIG. 9.

FIG. 9B illustrates a cross sectional view of a thermistor probe 970 formed according to operations performed at blocks 925B and 925C. For the illustrated embodiment of FIG. 9B, forming the at least one hole comprises forming a first hole of a first diameter 973 and a first depth 975 in a first surface 985 of the probe body 105, and forming a second hole of a second diameter 980 at the bottom of the first hole. In the illustrated embodiment, the second hole is drilled all the way to a second surface 990 that is opposite the first surface 985. The use of two holes with different diameters can provide a third surface 195 inside the probe body to mount the HTS thermistor 108 to.

Referring back to FIG. 9A, at block 955, leads are attached to the HTS thermistor. In one embodiment, attaching leads to the thermistor comprises coating at least one surface of the probe body with a conductive layer, block 955A. In one embodiment, attaching leads to the thermistor further comprises etching the electrically conductive layer, block 955B.

Figure 10A:
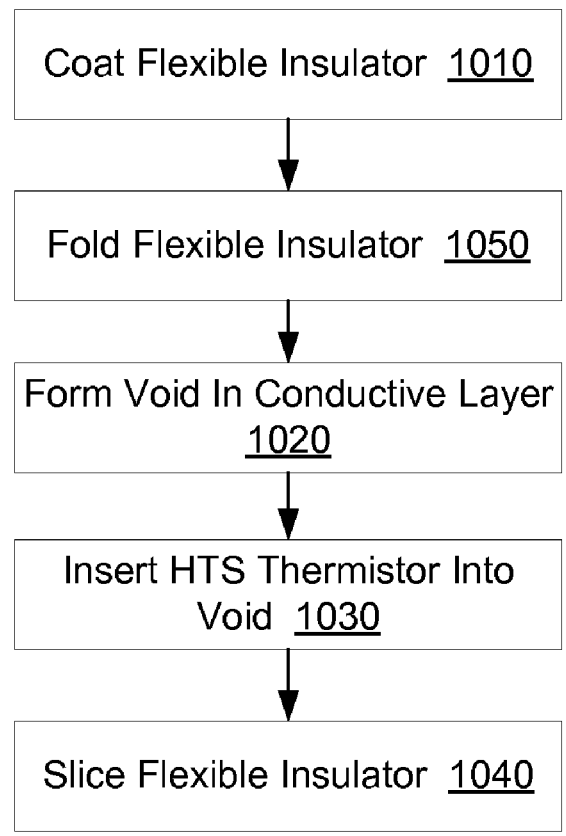
FIG. 10A illustrates a process flow of a method for forming a thermistor probe, in accordance with one embodiment of the present invention.

FIG. 10A illustrates a flow diagram of a process 1000 for forming a thermistor probe, in accordance with one embodiment of the present invention. At block 1010, a surface of a flexible insulator is coated with a conductive layer. At block 1020, a void is formed in the conductive layer by etching a rectangular region, having a predetermined width, along a first axis. At block 1030, an HTS thermistor is inserted into the void and attached to the conductive layer. In one embodiment, the HTS thermistor comprises a thin piece of semiconductor material having ohmic contacts on opposing surfaces. In one embodiment, the HTS thermistor is attached to the conductive layer by conductive epoxy or soldering. At block 1040, the flexible insulator is diced along a second axis, the second axis being approximately perpendicular to the first axis. In one embodiment, process 1000 further includes block 1050, in which the flexible insulator is folded along a line parallel to the void. In one embodiment, the flexible insulator is folded before attaching the HTS thermistor. In one embodiment, the flexible insulator is glued after folding to maintain the folded shape. Thermistor probes formed in accordance with this method can have a cross section as small as about 100×100 um$^2$. This can be advantageous, such as when used in medical devices, such as those that are used in the human body.

Figure 10B:
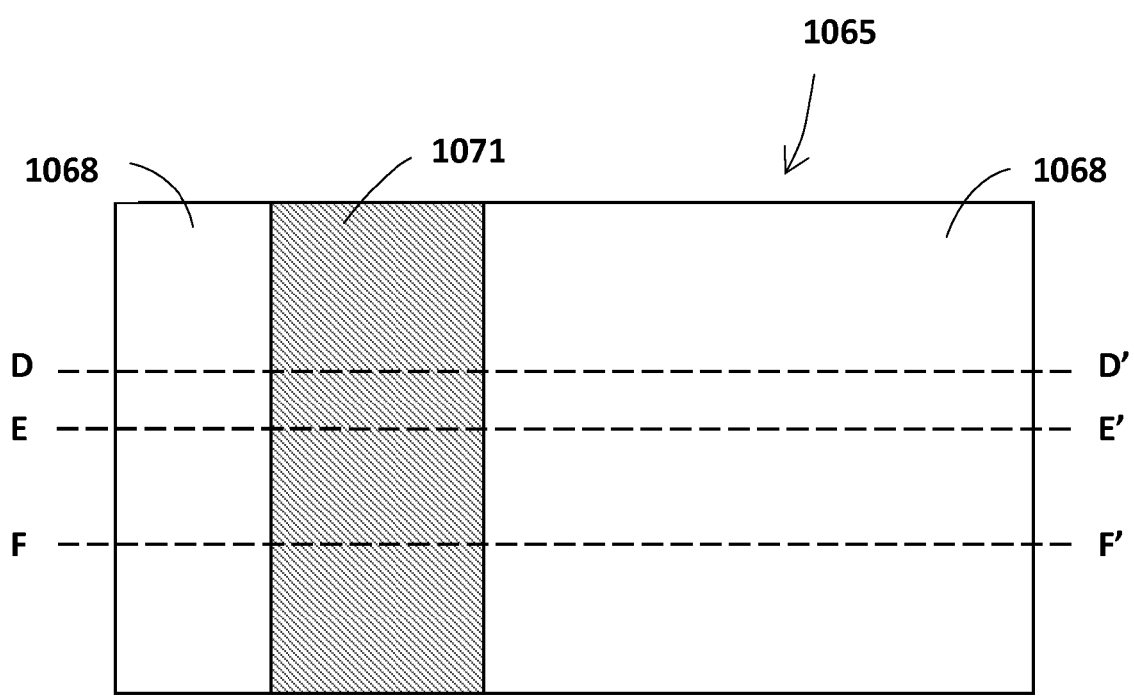
FIG. 10B illustrates a top view of multiple thermistor probes formed according to the method shown in FIG. 10A.

FIG. 10B illustrates a top view of multiple thermistor probes 1065 formed in accordance with the process 1000 of FIG. 10A. The multiple thermistor probes 1065 each include a flexible insulator coated with a conductive layer 1068 and electrically connected to an HTS thermistor 1071. Before being diced, the multiple thermistor probes 1065 are part of one large thermistor probe. The large thermistor probe is diced along lines D-D', E-E' and F-F' to form multiple separate thermistor probes.

Figure 10C:
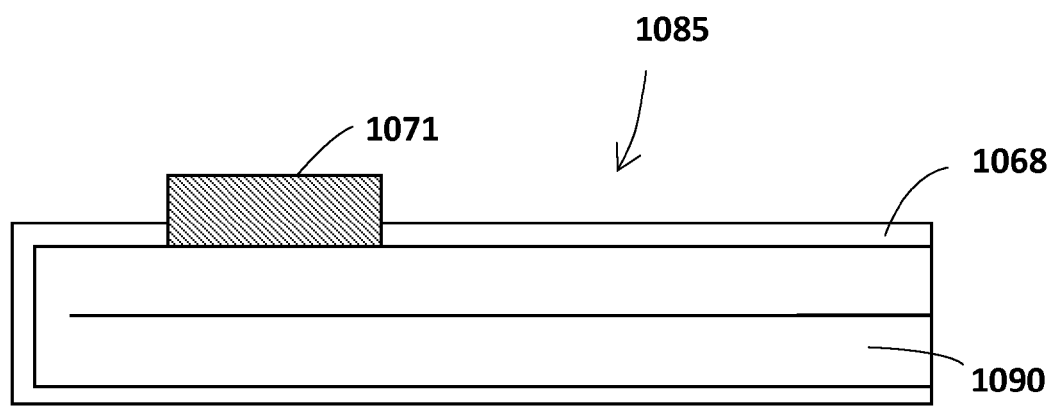
FIG. 10C illustrates a side view of the multiple thermistor probes shown in FIG. 10B.

FIG. 10C shows a side view 1085 of a representative member of the multiple thermistor probes 1065 of FIG. 10B. In the illustrated embodiment, the flexible insulator 1090 has been folded such that the conductive layer 1068 is on the outside of the fold.

Figure 11:
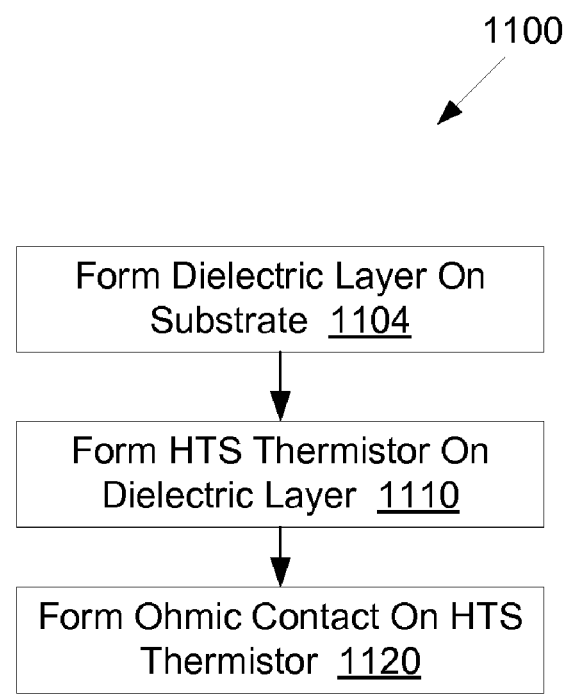
FIG. 11 illustrates a process flow of a method for forming an integrated circuit, in accordance with one embodiment of the present invention.

FIG. 11 illustrates a flow diagram of a process 1100 for forming a thermistor probe on a silicon wafer as an integrated circuit. At block 1104, a dielectric layer is formed on a substrate. In one embodiment, the substrate comprises a single crystal Si substrate. In one embodiment, additional layers are formed on the substrate prior to formation of the dielectric layer. At block 1110, an HTS thermistor layer is formed on the dielectric layer by deposition of Si with intrinsic conductivity. At block 1120, ohmic contacts are formed on the HTS thermistor layer. In one embodiment, the ohmic contacts are formed by heating the HTS thermistor layer and forming a metal film on the heated HTS thermistor layer. In one embodiment, Al is formed on the heated HTS thermistor layer. In one embodiment, the HTS thermistor layer is heated to between about 300-500° C. In one embodiment, the HTS thermistor layer is etched, such as to form multiple HTS thermistors. In one embodiment, the ohmic contacts are etched to form interconnects.

The foregoing embodiments of the invention have been presented for the purpose of illustration. Although the embodiments of the invention have been described by certain preceding examples, the invention is not to be construed as being limited by them. They are not intended to be exhaustive, or to limit the scope of the invention. Modifications, improvements and variations within the scope of the invention are possible in light of this disclosure.

What is claimed is:

1. A probe comprising:
   a probe body;
   at least one high temperature negative temperature coefficient (NTC) semiconductor thermistor having a thickness of at least 100 um attached to the probe body, the high temperature NTC semiconductor thermistor consisting of Ge, Si, GaAs or InSb; and
   at least two conductive leads connected to the at least one high temperature NTC semiconductor thermistor.

2. The probe of claim 1, wherein the high temperature NTC semiconductor thermistor consists of Ge, Si, GaAs or InSb with intrinsic electrical conductivity at room temperature.

3. The probe of claim 1, further comprising:
   an ohmic contact on at least one surface of the high temperature NTC semiconductor thermistor.

4. The probe of claim 1, wherein the probe body is at least one of a flexible and an inflexible insulator comprising at least one of a prepreg, polyimide, ceramic, quartz, teflon, capton, SiC, and diamond.

5. The probe of claim 1, wherein each of the at least two conductive leads comprises one of:
   an inner electrically conductive layer inside the probe body;
   a first outer electrically conductive layer that coats a first surface of the probe body; and
   a second outer electrically conductive layer that coats a second surface of the probe body.

6. The probe of claim 5, wherein the at least one high temperature NTC semiconductor thermistor comprises:
   a first high temperature NTC semiconductor thermistor connected to the first outer electrically conductive layer and the inner electrically conductive layer; and
   a second high temperature NTC semiconductor thermistor connected to the second outer electrically conductive layer and the inner electrically conductive layer.

7. The probe of claim 5, wherein the at least one high temperature NTC semiconductor thermistor comprises:
   a first high temperature NTC semiconductor thermistor connected to the first outer electrically conductive layer and a first inner electrically conductive layer; and
   a second high temperature NTC semiconductor thermistor connected to the second outer electrically conductive layer and a second inner electrically conductive layer.

8. The probe of claim 1, wherein the at least one high temperature NTC semiconductor thermistor has:
   a minimum operating temperature reading of about −100° C.; and
   a maximum operating temperature reading of about 500° C.

9. The probe of claim 1, wherein the at least one high temperature NTC semiconductor thermistor is located within the probe body.

10. The probe of claim 1, wherein the at least one high temperature NTC semiconductor thermistor is mounted on a surface of the probe body.

11. The probe of claim 1, wherein the at least one high temperature NTC semiconductor thermistor is packaged in a surface mounted package.

12. The probe of claim 1, further comprising:
    a measuring circuit connected to one or more of the at least two conductive leads.

13. The probe of claim 1 wherein the at least one high temperature NTC semiconductor thermistor comprises a plurality of high temperature NTC semiconductor thermistors, each of the plurality of high temperature NTC semiconductor thermistors attached to different locations of the probe body.

14. A system, comprising:
    a device; and
    a temperature sensor assembly attached to the device, the temperature sensor assembly comprising:
       an insulative body;
       at least one high temperature negative temperature coefficient (NTC) semiconductor thermistor having a thickness of at least 100 um attached to the body, the high temperature NTC semiconductor thermistor consisting of Ge, Si, GaAs or InSb; and
       at least two conductive leads connected to the at least one high temperature NTC semiconductor thermistor.

15. The system of claim 14, wherein the high temperature NTC semiconductor thermistor consists of Ge, Si, GaAs or InSb with intrinsic electrical conductivity at room temperature.

16. The system of claim 14, further comprising:
    an ohmic contact on at least one surface of the high temperature NTC semiconductor thermistor.

17. The system of claim 14, wherein the at least one high temperature NTC semiconductor thermistor has:
    a minimum operating temperature reading of about −100° C.; and
    a maximum operating temperature reading of about 500° C.

18. The system of claim 14, wherein the high temperature NTC semiconductor thermistor is manufactured from an ingot of semiconductor material.

* * * * *